Dec. 29, 1964   W. J. SCHWERTFEGER   3,163,345
EGG CARTONS
Filed June 14, 1960   2 Sheets-Sheet 2
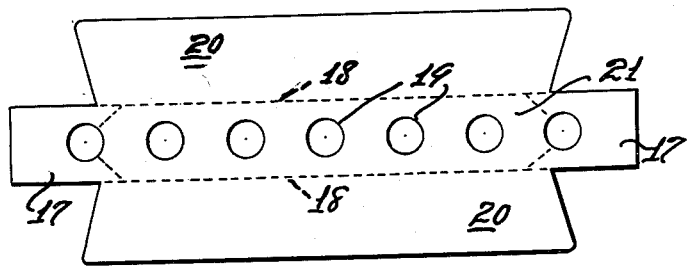
FIG.6
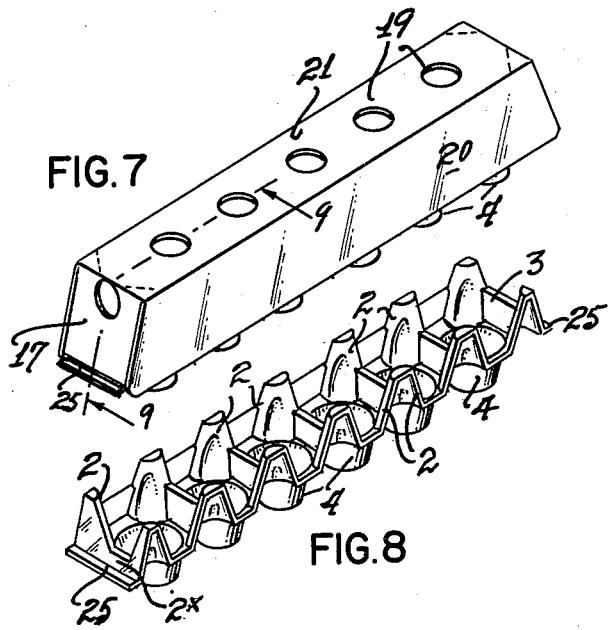
FIG.7
FIG.8
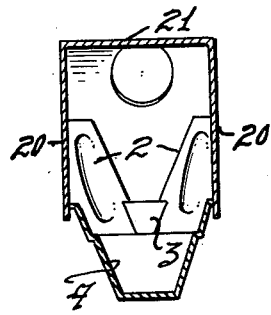
FIG.10
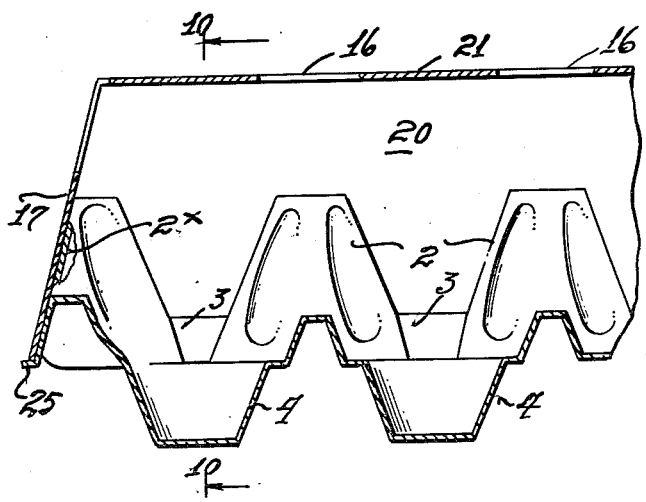
FIG.9
INVENTOR.

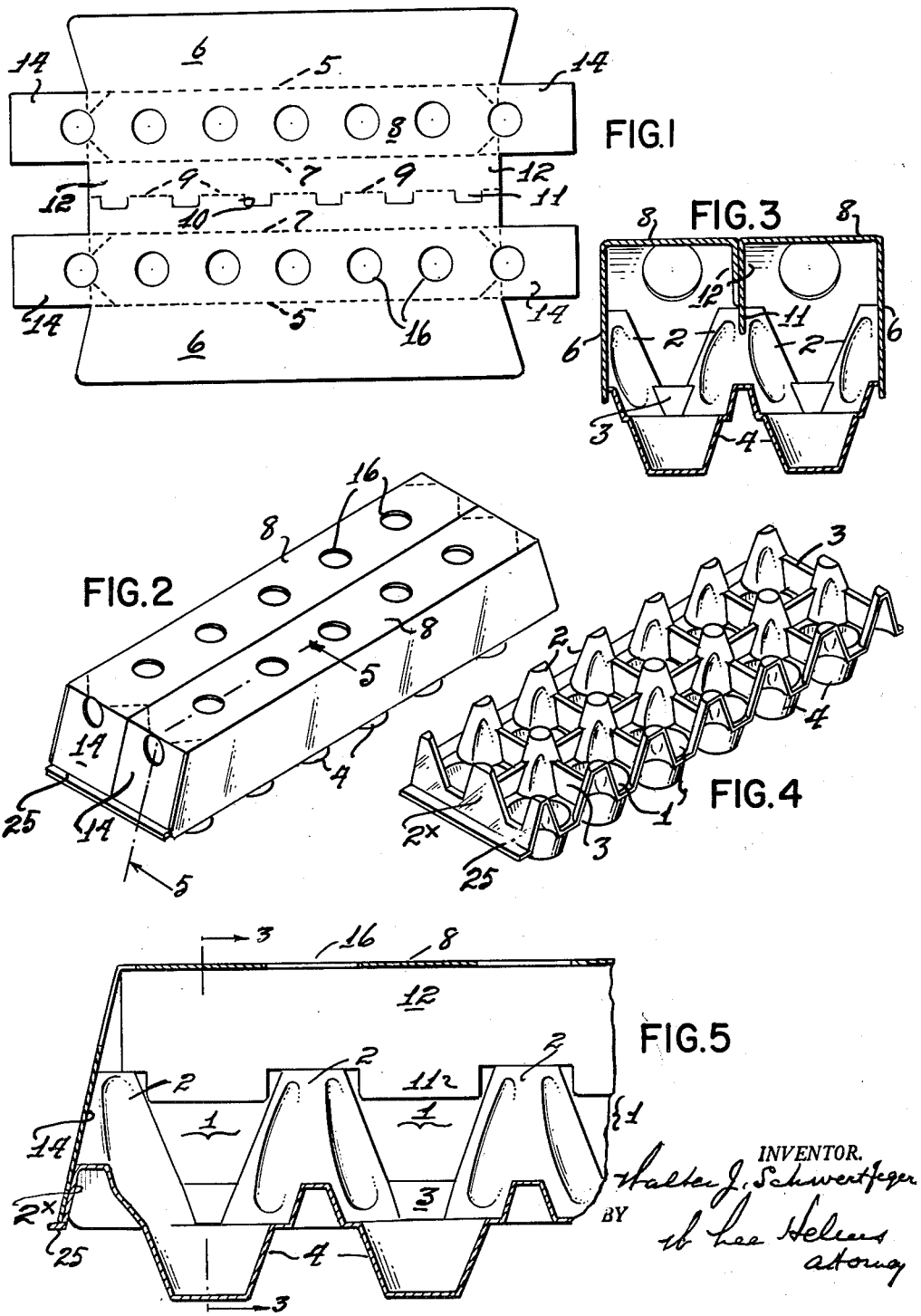

United States Patent Office 3,163,345
Patented Dec. 29, 1964

3,163,345
EGG CARTONS
Walter J. Schwertfeger, Englewood, N.J., assignor to Alton Box Board Company, Alton, Ill., a corporation of Illinois
Filed June 14, 1960, Ser. No. 36,072
1 Claim. (Cl. 229—29)

The object of the present invention is to provide a retail egg package combining a tray usually made from a cut section of a wholesale egg tray, the latter customarily being of blown pulp and holding a plurality of a dozen eggs. Of course the tray, whether for one dozen egg package or a one-half dozen egg package, may be formed individually in any desired manner. The complementary package member for the egg holding tray is a folded unitary sheet of cardboard so arranged that it covers and is adhesively secured to the ends and sides of the egg tray, and which preferably is so formed as to provide a top longitudinal center area which projects downwardly, in the case of a one dozen egg package, to form lugs lying intermediate spaced upstanding members of the tray.

By means of the invention, filled egg trays may be automatically encased in the cardboard cover, since the folding and gluing of the latter by rapid acting machine is made simple through its form.

The egg holding trays now used, and of which an embodiment is shown in the drawing, hold the eggs upwardly from the bottoms of downwardly projecting posts, and in the present invention the eggs are protected without the necessity of carton or cover elements over the bottom of the egg tray, the latter is exposed, the eggs being adequately protected by the posts.

The invention will be described with reference to the accompanying drawings, in which:

FIG. 1 is a plan view of the cover or carton blank used for a tray holding one dozen eggs, as an example;

FIG. 2 is a perspective view of a closed package embodying my invention;

FIG. 3 is a vertical section taken transversely of the structure shown in FIG. 2 on the line 3—3, FIG. 5;

FIG. 4 is a perspective view of a suitable egg tray embodiment;

FIG. 5 is a fragmentary longitudinal section taken on the line 5—5, FIG. 2;

FIG. 6 is a plan view of the blank suitable for a cover or carton for an egg tray holding one-half dozen eggs;

FIG. 7 is a perspective view of the one-half dozen egg completed carton;

FIG. 8 is a perspective view of a tray member or section for holding ½ dozen eggs;

FIG. 9 is a fragmentary section taken on the line 9—9, FIG. 7; and

FIG. 10 is a vertical section taken on the line 10—10, FIG. 9.

Referring to FIGS. 1 to 5 of the drawings, the egg tray member or tray section shown in FIGS. 4 and 5 contains two rows of pockets 1 for receiving eggs in such manner that the eggs are laterally supported by the upstanding posts 2 and connecting elements 3 between the posts. The base of each pocket is formed as a downwardly extending hollow post 4, and as customary this depending post is so restricted in transverse area as to hold the end of an egg upwardly and thus providing the lowermost cushioning element for the egg.

The carton or cover blank, shown in FIG. 1, consists of a unitary piece of cardboard or the like having scored lines at 5 inwardly bounding side walls 6, the inner area between scored line 5, in each case, and a longitudinal scored line 7, comprising top members for the carton indicated at 8, and which will abut, as shown in FIG. 3 when the carton is wrapped around the egg filled tray shown in FIG. 4.

Preferably there is formed intermediate scored lines 7 a special form of fold consisting of spaced scored lines 9 running longitudinally of the cover or carton member and U-shaped cuts at 10. Thus when the top walls 8 are brought together by folding on the scored lines 7 and 9, there will be downwardly projected spaced lugs 11, as shown in FIG. 3, and these spaced lugs will lie adjacent or in abutment to the posts, as shown in FIG. 5. The two vertical wall members carrying the lugs 11, and which are formed by the area of the blank intermediate the scored lines 7, are indicated by the numeral 12.

At each end of the blank, projecting walls 14 are provided, and when the carton is wrapped around the filled egg tray, as shown in FIG. 2, with the projected walls 14 moved downwardly, they will abut the flattened sides at $2_x$ of the end posts 2 for adherence thereto by the use of any suitable adhesive, as hereinafter explained.

It is preferred that for inspecting the color of the eggs in the tray, when the tray is covered by the cover or carton member just described, the latter be formed with rows of sight openings 16. These sight openings are preferably positioned directly over the egg-receiving pockets, but to show that their position may be varied, as desired, the openings are shown offset from the pockets in the drawings. The blank for the one-half dozen egg tray, shown in FIG. 8, is illustrated in FIG. 6. It consists of a unitary cardboard blank having a single projected wall 17 at each end, longitudinal scored lines at 18, and is preferably formed with sight openings at 19. At each side of a scored line 18, the area 20 forms a side wall. The center area 21 forms the top wall, and the projected walls 17 form the end wall closures. As in the case of the egg tray, shown in FIG. 4, the outermost posts 2 have flattened walls at $2_x$ adapted to receive adhesive, and the end walls 17 of the cover or carton abut said flattened areas for securing the egg tray and cover or carton together. Likewise adhesive may be applied to the outer edges of the outside posts for adherance to the cover or carton member side walls.

It will be noted that in both the cover member or carton for the one dozen package, and the cover member or carton for the one-half dozen package, the end or outwardly projected walls of the blank may be apertured for sight purposes, and of course the apertures provide adequate ventilation.

It will be seen that outwardly of the egg tray at each end a projecting ledge 25 is formed, which provides a registration rest for the cover or carton member.

For tearing away the top of the cover member or carton, the latter may be formed with any suitable weakened tear-lines, those shown on FIGS. 2 and 7 being indicative only.

It will be understood that various modifications may be made in the form and arrangement of the elements above illustrated and described, and particularly those of the egg trays, without departure from the spirit of the invention.

Having described my invention, what I claim and desire to secure by Letters Patent is as follows:

A retail package for eggs comprising an egg holding tray in which the tray is formed with a centrally located longitudinal row of hollow frusto-conical posts separating two rows of egg receiving pockets, each of said two rows of pockets having at its outer side a row of projections presenting outwardly directed and inverted generally U-shaped edges with abutting co-active and adhesive bonding to one side wall of a cover having a top wall and opposed side walls, the bottom of the package consisting of the tray only, a lower area of said tray lying below said side walls of the cover member.

References Cited in the file of this patent

UNITED STATES PATENTS

| | | |
|---|---|---|
| 2,154,195 | Benoit | Apr. 11, 1939 |
| 2,634,039 | Schwertfeger | Apr. 7, 1953 |
| 2,764,334 | Schwertfeger | Sept. 25, 1956 |